(12) United States Patent
Pinguet et al.

(10) Patent No.: US 10,341,021 B2
(45) Date of Patent: *Jul. 2, 2019

(54) METHOD AND SYSTEM FOR OPTOELECTRONICS TRANSCEIVERS INTEGRATED ON A CMOS CHIP

(71) Applicant: Luxtera, Inc., Carlsbad, CA (US)

(72) Inventors: Thierry Pinguet, Cardiff-by-the-Sea, CA (US); Steffen Gloeckner, San Diego, CA (US); Sherif Abdalla, Carlsbad, CA (US); Sina Mirsaidi, San Diego, CA (US); Peter De Dobbelaere, San Diego, CA (US)

(73) Assignee: Luxtera, Inc., Carlsbad, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/804,680

(22) Filed: Nov. 6, 2017

(65) Prior Publication Data

US 2018/0323873 A1 Nov. 8, 2018

Related U.S. Application Data

(63) Continuation of application No. 12/241,961, filed on Sep. 30, 2008, now Pat. No. 9,813,152, which is a (Continued)

(51) Int. Cl.
*H04B 10/25* (2013.01)
*G02B 6/122* (2006.01)
(Continued)

(52) U.S. Cl.
CPC ............ *H04B 10/25* (2013.01); *G02B 6/124* (2013.01); *G02B 6/1228* (2013.01); *G02B 6/43* (2013.01); *G02B 6/4214* (2013.01)

(58) Field of Classification Search
CPC combination set(s) only.
See application file for complete search history.

(56) References Cited

U.S. PATENT DOCUMENTS

| 5,408,146 | A | * | 4/1995 | Nguyen | H03K 19/00361 326/114 |
| 6,097,748 | A | | 8/2000 | Huang et al. | |

(Continued)

OTHER PUBLICATIONS

Chinese Patent Office, First Office Action in applications No. 200880116716.0 dated Feb. 14, 2012, with translation.
(Continued)

*Primary Examiner* — David C Payne
*Assistant Examiner* — Omar S Ismail
(74) *Attorney, Agent, or Firm* — McAndrews, Held & Malloy

(57) ABSTRACT

Methods and systems for optoelectronics transceivers integrated on a CMOS chip are disclosed and may include receiving optical signals from optical fibers via grating couplers on a top surface of a CMOS chip, which may include a guard ring. Photodetectors may be integrated in the CMOS chip. A CW optical signal may be received from a laser source via optical couplers, and may be modulated using optical modulators, which may be Mach-Zehnder and/or ring modulators. Circuitry in the CMOS chip may drive the optical modulators. The modulated optical signal may be communicated out of the top surface of the CMOS chip into optical fibers via grating couplers. The received optical signals may be communicated between devices via waveguides. The photodetectors may include germanium waveguide photodiodes, avalanche photodiodes, and/or heterojunction diodes. The CW optical signal may be generated using an edge-emitting and/or a vertical-cavity surface emitting semiconductor laser.

26 Claims, 12 Drawing Sheets

Related U.S. Application Data continuation-in-part of application No. 11/611,084, filed on Dec. 14, 2006, now Pat. No. 7,773,836, which is a continuation-in-part of application No. 10/758,561, filed on Jan. 14, 2004, now Pat. No. 7,251,386, and a continuation-in-part of application No. 10/799,040, filed on Mar. 11, 2004, now Pat. No. 7,162,124, and a continuation-in-part of application No. 10/917,204, filed on Aug. 11, 2004, now Pat. No. 7,116,853, and a continuation-in-part of application No. 11/384,019, filed on Mar. 17, 2006, now Pat. No. 7,298,945.

(60) Provisional application No. 61/057,127, filed on May 29, 2008, provisional application No. 60/997,298, filed on Oct. 2, 2007, provisional application No. 60/750,488, filed on Dec. 14, 2005.

(51) Int. Cl.
*G02B 6/124* (2006.01)
*G02B 6/43* (2006.01)
*G02B 6/42* (2006.01)

(56) References Cited

U.S. PATENT DOCUMENTS

| | | | |
|---|---|---|---|
| 6,527,458 B2 | 3/2003 | Kim | |
| 6,744,548 B2 | 6/2004 | Abeles | |
| 7,162,124 B1 | 1/2007 | Gunn et al. | |
| 7,251,386 B1 | 7/2007 | Dickinson | |
| 7,397,101 B1 | 7/2008 | Masini et al. | |
| 2002/0039464 A1* | 4/2002 | Yoshimura | G02B 6/10 385/14 |
| 2002/0081056 A1* | 6/2002 | Kaneko | G02B 6/42 385/14 |
| 2003/0026575 A1* | 2/2003 | Lempkowski | G02B 6/10 385/131 |
| 2003/0109142 A1* | 6/2003 | Cable | G02B 6/4231 438/708 |
| 2004/0069984 A1* | 4/2004 | Estes | B82Y 10/00 257/25 |
| 2004/0069997 A1 | 4/2004 | Dair et al. | |
| 2006/0008223 A1 | 1/2006 | Gunn et al. | |
| 2006/0038168 A1 | 2/2006 | Estes et al. | |
| 2006/0210215 A1* | 9/2006 | Aoki | H04B 10/40 385/14 |
| 2006/0289957 A1 | 12/2006 | Morse et al. | |
| 2007/0012876 A1 | 1/2007 | Lee et al. | |
| 2007/0230854 A1* | 10/2007 | Felix Keil | G02F 1/0121 385/1 |
| 2007/0230878 A1 | 10/2007 | Nakazawa et al. | |
| 2007/0237444 A1* | 10/2007 | Keil | B82Y 20/00 385/3 |
| 2009/0152450 A1 | 6/2009 | Feldman et al. | |
| 2010/0006784 A1* | 1/2010 | Mack | H04B 10/503 250/551 |
| 2010/0266240 A1* | 10/2010 | Krishnamoorthy | G02B 6/43 385/37 |

OTHER PUBLICATIONS

European Patent Office, Communication with extended European search report, in application No. 08837593.6-152412201417 PCT/US2008078398, dated Mar. 16, 2012. (8 pages).

Behnam, Analui et al., "A Fully Integrated 20-Gb/s Optoelectonic Transceiver Implemented in a Standard 0.13-CMOS SOI Technology", IEEE Journal of Solid-State circuits, IEEE Service Center, Piscatway, NJ, USA, vol. 41, No. 12, Dec. 1, 2006 (Dec. 1, 2006), pp. 2945-2955, XP011150709, ISSN:0018-9200, DOI: 10.1109/JSSC.2006.884388, p. 2945-p. 2948; figures 2, 4, 14 (12 pages).

Gianlorenzo Masini et al., "High-speed monolithic CMOS Receivers at 1550nm with Ge on Si Waveguide Photodetectors", Lasers and Electro-Optics Society, 2007, LEOS 2007. The 20th Annual meeting of the IEEE, IEEE, PI, Oct. 1, 2007 (Oct. 7, 2007), pp. 848-849, XP031160848, ISBN: 978-1-4244-0924-2; the whole document (2 pages).

Chinese Office Action in Application No. 200880116716.0, dated Nov. 28, 2012, with translation. (15 pages).

International Search Report and Written Opinion corresponding to International Application Serial No. PCT/US2008/78398, dated Dec. 12, 2008, 7 pages.

PCT/US2008/078398, Patent Cooperation Treaty Notification Concerning Tranmsittal of International preliminary Report on Patentability with Written Opinion, dated Apr. 15, 2010.

* cited by examiner

METHOD AND SYSTEM FOR OPTOELECTRONICS TRANSCEIVERS INTEGRATED ON A CMOS CHIP

CROSS-REFERENCE TO RELATED APPLICATIONS/INCORPORATION BY REFERENCE

This application is a continuation of U.S. patent application Ser. No. 12/241,961 filed on Sep. 30, 2008, which makes reference to and claims priority to U.S. Provisional Application Ser. No. 61/057,127 filed on May 29, 2008, and Provisional Application Ser. No. 60/997,298 filed on Oct. 2, 2007, each of which are hereby incorporated herein by reference in their entirety.

Said application Ser. No. 12/241,961 is also a continuation in part of U.S. patent application Ser. No. 11/611,084 filed on Dec. 14, 2006, which in turn makes reference to, claims priority to and claims the benefit of U.S. Provisional Patent Application No. 60/750,488 filed Dec. 14, 2005, titled "Novel Low-Cost Transceiver Approach." Said application Ser. No. 11/611,084 is also a continuation-in-part of the following: (1) U.S. patent application Ser. No. 10/758,561 filed on Jan. 14, 2004, now U.S. Pat. No. 7,251,386, (2) U.S. patent application Ser. No. 10/799,040 filed on Mar. 11, 2004, now U.S. Pat. No. 7,162,124, (3) U.S. patent application Ser. No. 10/917,204 filed on Aug. 11, 2004, now U.S. Pat. No. 7,116,853 and (4) U.S. patent application Ser. No. 11/384,019 filed on Mar. 17, 2006, now U.S. Pat. No. 7,298,945.

This application also makes reference to U.S. Pat. Nos. 6,895,148; 7,039,258; 7,245,803; and 7,366,380.

Each of the above stated applications and patents is hereby incorporated herein by reference in its entirety.

FEDERALLY SPONSORED RESEARCH OR DEVELOPMENT

[Not Applicable]

MICROFICHE/COPYRIGHT REFERENCE

[Not Applicable]

FIELD OF THE INVENTION

Certain embodiments of the invention relate to integrated circuit power control. More specifically, certain embodiments of the invention relate to a method and system for optoelectronics transceivers integrated on a CMOS chip.

BACKGROUND OF THE INVENTION

As data networks scale to meet ever-increasing bandwidth requirements, the shortcomings of copper data channels are becoming apparent. Signal attenuation and crosstalk due to radiated electromagnetic energy are the main impediments encountered by designers of such systems. They can be mitigated to some extent with equalization, coding, and shielding, but these techniques require considerable power, complexity, and cable bulk penalties while offering only modest improvements in reach and very limited scalability. Free of such channel limitations, optical communication has been recognized as the successor to copper links.

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

A system and/or method for optoelectronics transceivers integrated on a CMOS chip, substantially as shown in and/or described in connection with at least one of the figures, as set forth more completely in the claims.

Various advantages, aspects and novel features of the present invention, as well as details of an illustrated embodiment thereof, will be more fully understood from the following description and drawings.

DETAILED DESCRIPTION OF THE INVENTION

Certain aspects of the invention may be found in a method and system for optoelectronics transceivers integrated on a CMOS chip. Exemplary aspects of the invention may comprise receiving optical signals from one or more optical fibers via grating couplers on a top surface of a CMOS chip. The optical signals may be converted to electrical signals via one or more photodetectors integrated in or on the CMOS chip. The electrical signals may be processed via circuitry in the CMOS chip. A continuous-wave (CW) optical signal may be received from a laser source via grating couplers on the top surface of the CMOS chip, and may be modulated via one or more optical modulators integrated in or on the CMOS chip. Electrical signals may be received via the circuitry in the CMOS chip, and may drive the one or more optical modulators. The modulated optical signal may be communicated out of the top surface of the CMOS chip into one or more optical fibers via one or more grating couplers integrated in or on the CMOS chip. The received CW optical signal may be modulated via Mach-Zehnder modulators and/or ring modulators, for example. The CMOS chip may comprise a CMOS guard ring. The received optical signals may be communicated between devices on the CMOS chip via waveguides. The one or more photodetectors may comprise germanium waveguide photodiodes, germanium waveguide avalanche photodiodes, and/or heterojunction diodes, for example. The CW optical signal may be generated using an edge-emitting semiconductor laser and/or a vertical-cavity surface emitting semiconductor laser, which may be bonded to the top surface of the CMOS chip, for example. The one or more modulators may be driven using circuitry on the CMOS chip.

Figure 1A:
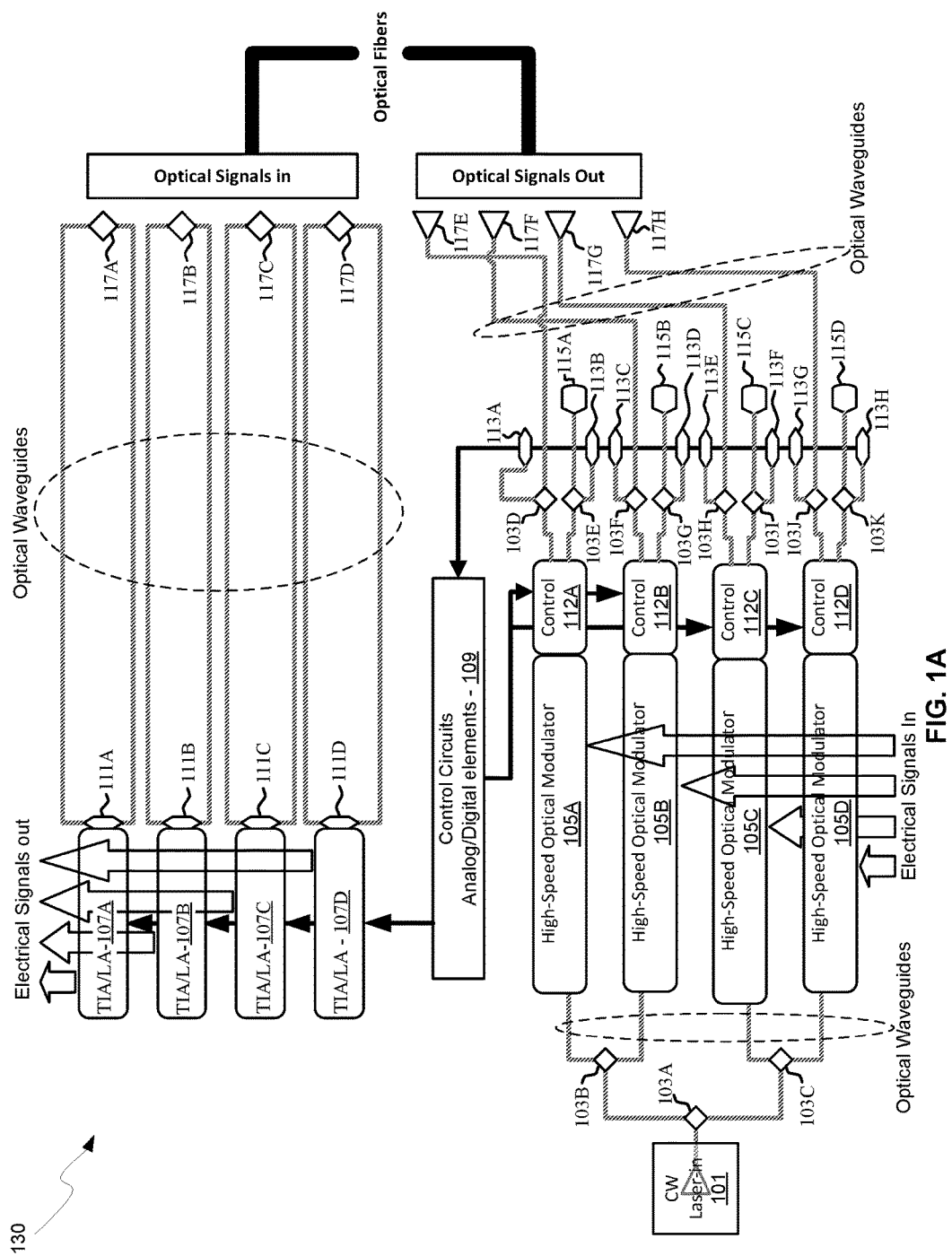
FIG. 1A is a block diagram of a photonically enabled CMOS chip, in accordance with an embodiment of the invention.

FIG. 1A is a block diagram of a photonically enabled CMOS chip, in accordance with an embodiment of the invention. Referring to FIG. 1A, there is shown optoelectronic devices on a CMOS chip 130 comprising high speed optical modulators 105A-105D, high-speed photodiodes 111A-111D, monitor photodiodes 113A-113H, and optical devices comprising taps 103A-103K, optical terminations 115A-115D, and grating couplers 117A-117H. There is also shown electrical devices and circuits comprising transimpedance and limiting amplifiers (TIA/LAs) 107A-107D, analog and digital control circuits 109, and control sections 112A-112D. Optical signals are communicated between optical and optoelectronic devices via optical waveguides fabricated in the CMOS chip 130. Additionally, optical waveguides are indicated in FIG. 1A by the dashed ovals.

The high speed optical modulators 105A-105D comprise Mach-Zehnder or ring modulators, for example, and enable the modulation of the CW laser input signal. The high speed optical modulators 105A-105D are controlled by the control sections 112A-112D, and the outputs of the modulators are optically coupled via waveguides to the grating couplers 117E-117H. The taps 103D-103K comprise four-port optical couplers, for example, and are utilized to sample the optical signals generated by the high speed optical modulators 105A-105D, with the sampled signals being measured by the monitor photodiodes 113A-113H. The unused branches of the taps 103D-103K are terminated by optical terminations 115A-115D to avoid back reflections of unwanted signals.

The grating couplers 117A-117H comprise optical gratings that enable coupling of light into and out of the CMOS chip 130. The grating couplers 117A-117D are utilized to couple light received from optical fibers into the CMOS chip 130, and may comprise polarization independent grating couplers. The grating couplers 117E-117H are utilized to couple light from the CMOS chip 130 into optical fibers. The optical fibers may be epoxied, for example, to the CMOS chip, and may be aligned at an angle from normal to the surface of the CMOS chip 130 to optimize coupling efficiency.

The high-speed photodiodes 111A-111D convert optical signals received from the grating couplers 117A-117D into electrical signals that are communicated to the TIA/LAs 107A-107D for processing. The analog and digital control circuits 109 may control gain levels or other parameters in the operation of the TIA/LAs 107A-107D. The TIA/LAs 107A-107D may then communicate electrical signals to other circuitry on the CMOS chip 130 and/or circuitry/devices off-chip.

The TIA/LAs 107A-107D may comprise narrowband, non-linear optoelectronic receiver circuitry. Accordingly, the narrowband receiver front-end may be followed by a non-return to zero (NRZ) level restorer circuit. This circuit limits the bandwidth of the optical receiver in order to decrease the integrated noise, thereby increasing the signal to noise ratio. An NRZ level restorer may be used to convert the resulting data pulses back into NRZ data.

The control sections 112A-112D comprise electronic circuitry that enable modulation of the CW laser signal received from the taps 103A-103C. The high speed optical modulators 105A-105D require high-speed electrical signals to modulate the refractive index in respective branches of a Mach-Zehnder interferometer (MZI), for example. The voltage swing required for driving the MZI is a significant power drain in the CMOS chip 130. Thus, if the electrical signal for driving the modulator may be split into domains with each domain traversing a lower voltage swing, power efficiency is increased.

In an embodiment of the invention, the integration of all optical, electrical and optoelectronic devices required for a transceiver, along with a coupled laser source, enables the integration of multiple optoelectronic transceivers on a single chip. In an exemplary embodiment, the CMOS chip 130 comprises four optoelectronic transceivers with one optical source, and enables communication of optical signals vertically to and from the chip surface, thus enabling the use of CMOS processes, including a CMOS guard ring, as discussed with respect to FIGS. 1B and 1C.

Figure 1B:
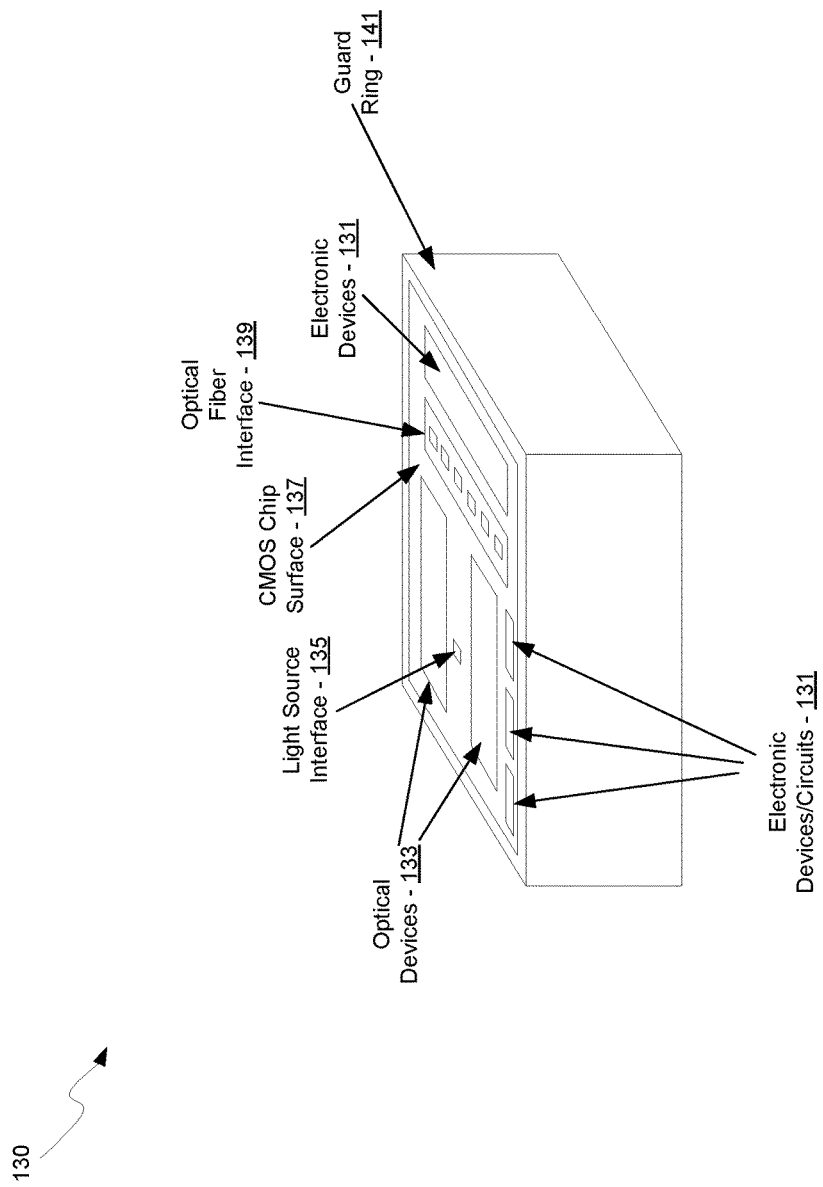
FIG. 1B is a diagram illustrating an oblique view of an exemplary photonically enabled CMOS chip, in accordance with an embodiment of the invention.

FIG. 1B is a diagram illustrating an oblique view of an exemplary photonically enabled CMOS chip, in accordance with an embodiment of the invention. Referring to FIG. 1B, there is shown the CMOS chip 130 comprising electronic devices/circuits 131, optical and optoelectronic devices 133, a light source interface 135, CMOS chip surface 137, an optical fiber interface 139, and CMOS guard ring 141.

The light source interface 135 and the optical fiber interface 139 comprise grating couplers that enable coupling of light signals via the CMOS chip surface 137, as opposed to the edges of the chip as with conventional edge-emitting devices. Coupling light signals via the CMOS chip surface 137 enables the use of the CMOS guard ring 141 which protects the chip mechanically and prevents the entry of contaminants via the chip edge.

The electronic devices/circuits 131 comprise circuitry such as the TIA/LAs 107A-107D and the analog and digital control circuits 109 described with respect to FIG. 1A, for example. The optical and optoelectronic devices 133 comprise devices such as the taps 103A-103K, optical terminations 115A-115D, grating couplers 117A-117H, high speed optical modulators 105A-105D, high-speed photodiodes 111A-111D, and monitor photodiodes 113A-113H.

Figure 1C:
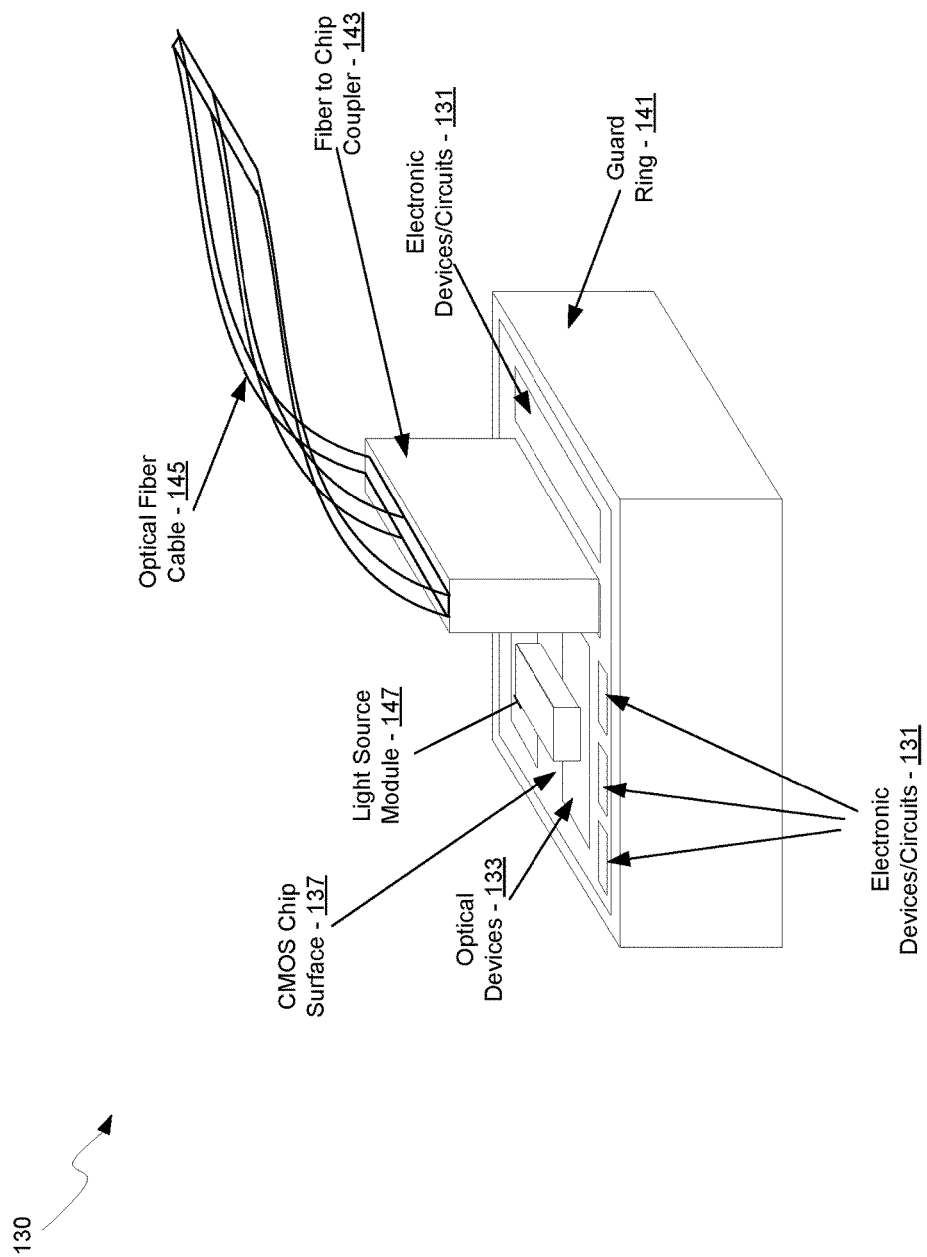
FIG. 1C is a diagram illustrating an exemplary CMOS chip coupled to an optical fiber cable, in accordance with an embodiment of the invention.

FIG. 1C is a diagram illustrating an exemplary CMOS chip coupled to an optical fiber cable, in accordance with an embodiment of the invention. Referring to FIG. 1C, there is shown the CMOS chip 130 comprising the electronic devices/circuits 131, the optical and optoelectronic devices 133, the CMOS chip surface 137, and the CMOS guard ring 141. There is also shown a fiber to chip coupler 143, an optical fiber cable 145, and a light source module 147.

The CMOS chip 130 comprising the electronic devices/circuits 131, the optical and optoelectronic devices 133, the CMOS chip surface 137, and the CMOS guard ring 141 may be as described with respect to FIG. 1B.

In an embodiment of the invention, the optical fiber cable may be affixed, via epoxy for example, to the CMOS chip surface 137. The fiber chip coupler 143 enables the physical coupling of the optical fiber cable 145 to the CMOS chip 130.

The light source module 147 may be affixed, via epoxy or solder, for example, to the CMOS chip surface 137. In this manner a high power light source may be integrated with optoelectronic and electronic functionalities of one or more high-speed optoelectronic transceivers on a single CMOS chip.

Figure 2A:
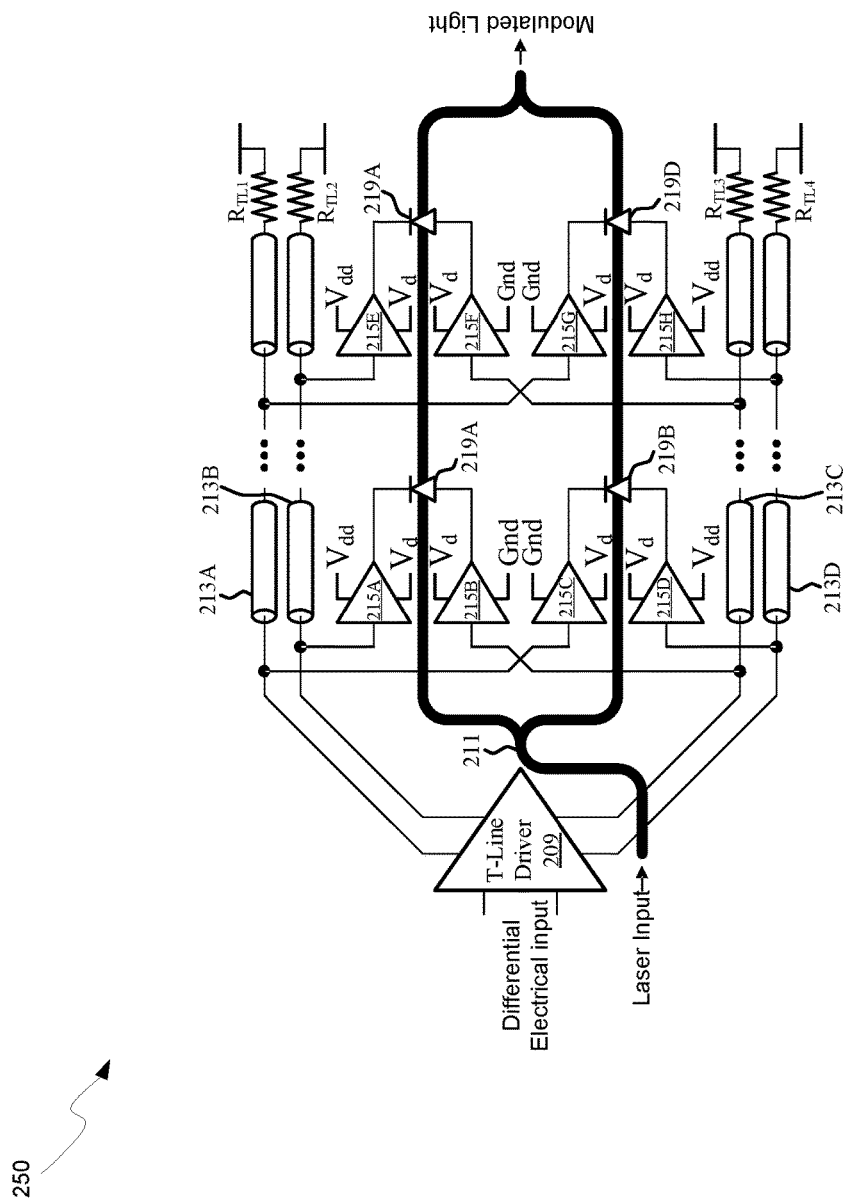
FIG. 2A is a block diagram of an exemplary split domain Mach-Zehnder modulator, in accordance with an embodiment of the invention.

FIG. 2A is a block diagram of an exemplary split domain Mach-Zehnder modulator, in accordance with an embodiment of the invention. Referring to FIG. 2A, there is shown a split-domain Mach-Zehnder modulator (MZM) 250 comprising a transmission line driver 209, waveguides 211, transmission lines 213A-213D, diode drivers 215A-215H, diodes 219A-219D, and transmission line termination resistors $R_{TL1}$-$R_{TL4}$. There is also shown voltage levels $V_{dd}$, $V_d$, and Gnd. In an embodiment of the invention, $V_d$ is equal to a voltage of $V_{dd}/2$, thus generating two voltage domains, due to the symmetric nature of the stacked circuits. However, the invention is not limited to two voltage domains. Accordingly, any number of voltage domains may be utilized, dependent on the desired voltage swing of each domain and the total voltage range, defined here as $V_{dd}$ to ground. Similarly, the magnitude of the voltage range in each voltage domain may be a different value than other domains.

The transmission line (T-line) driver 209 comprises circuitry for driving transmission lines in an even-coupled mode, where the signal on each pair of transmission lines is equal except with a DC offset. In this manner, two or more voltage domains may be utilized to drive the diodes that generate index changes in the respective branches of the MZM 250. In another embodiment of the invention, the T-line driver 209 may drive transmission lines in odd-coupled mode. Even-coupled mode may result in a higher impedance in the transmission line, whereas odd-coupling may result in lower impedance.

The waveguides 211 comprise the optical components of the MZM 250 and enable the routing of optical signals around the CMOS chip 130. The waveguides 211 comprise silicon and silicon dioxide, formed by CMOS fabrication processes, utilizing the index of refraction difference between Si and $SiO_2$ to confine an optical mode in the waveguides 211. The transmission line termination resistors $R_{TL1}$-$R_{TL4}$ enable impedance matching to the T-lines 213A-213D and thus reduced reflections.

The diode drivers 215A-215H comprise circuitry for driving the diodes 219A-219D, thereby changing the index of refraction locally in the waveguides 211. This index change in turn changes the velocity of the optical mode in the waveguides 211, such that when the waveguides merge again following the driver circuitry, the optical signals interfere constructively or destructively, thus modulating the laser input signal. By driving the diodes 219A-219D with a differential signal, where a signal is driven at each terminal of a diode, as opposed to one terminal being tied to AC ground, both power efficiency and bandwidth may be increased due to the reduced voltage swing required in each domain.

In operation, a CW optical signal is coupled into the "Laser Input", and a modulating differential electrical signal is communicated to the T-line driver 209. The T-line driver 209 generates complementary electrical signals to be communicated over the T-lines 213A-213D, with each pair of signals offset by a DC level to minimize the voltage swing of each diode driver 215A-215H, while still enabling a full voltage swing across the diodes 219A-219D.

Reverse biasing the diodes 219A-219D modifies the width of the depletion region, modulating the carrier density overlap with the optical mode, and thus the speed of the optical signal propagating through the waveguides 213A-213D. The optical signals then interfere constructively or destructively, resulting in the "Modulated Light" signal.

In an embodiment of the invention, the MZM 250 is integrated on the chip 130, enabling the integration of one or more transceivers on a single CMOS chip, whereas conventional transceivers utilize discrete optical, electrical, and optoelectronic devices and chips. By integrating optoelectronic transceivers on a single chip, power and space requirements may be greatly reduced.

Figure 2B:
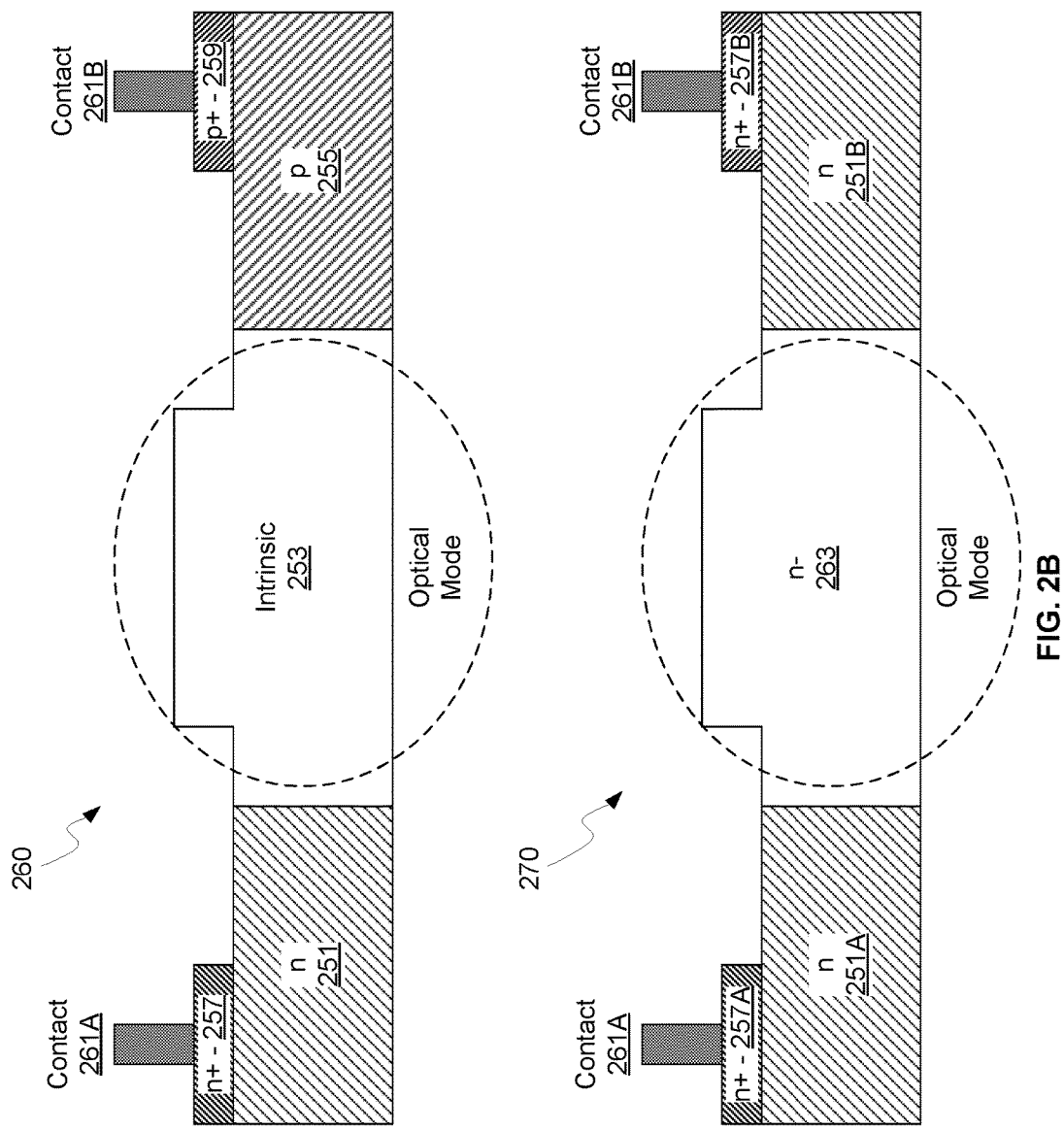
FIG. 2B is a cross-sectional schematic of exemplary phase modulators, in accordance with an embodiment of the invention.

FIG. 2B is a cross-sectional schematic of exemplary phase modulators, in accordance with an embodiment of the invention. Referring to FIG. 2B, there is shown a PIN phase modulator 260 and a thermal phase modulator (TPM) 270. The PIN phase modulator 260 comprises an n region 251, an intrinsic region 253, a p region 255, an n+ region 257, a p+ region 259, and contacts 261A and 261B. The TPM 270 comprises n region 251A and 251B, an n− region 263, n+ regions 257A and 257B, and contact layers 261A and 261 B.

The n region 251 comprises a region of n-type silicon to define the n-side of a PIN junction. The intrinsic region 253 comprises a region of unintentionally doped silicon, forming the i-region of a PIN junction. The p region 255 comprises p-doped silicon, forming the p-region of a PIN junction. The n+ region 257 and the p+ region 259 comprise low-resistivity doped silicon to enable ohmic contact to the PIN diode comprising the p region 255, the intrinsic region 253 and the n region 251. The contact layers 261A and 261B comprise metal or other low-resistivity material to enable an ohmic contact to the underlying semiconductor material.

Then regions 251A and 251B comprise regions of n-type silicon to define the n-sides of an n/n−/n resistive device. The n− region 263 may comprise a low n-doped silicon region to provide a resistive structure. The n+ regions 257A and 257B comprise highly-doped n-type silicon to enable ohmic contact to the lower n-doped material. The contact layers 261A and 261B comprise metal or other low-resistivity material to enable an ohmic contact to the underlying semiconductor material.

In operation, the PIN phase modulator 260 performance may be controlled by an electrical signal applied to the contacts 261A and 261B. In high-speed applications, the PIN phase modulator 260 may be reverse biased, which modifies the width of the depletion region, modulating the carrier density overlap with the optical mode, and thus the speed of the optical mode propagating through the PIN phase modulator 260. Alternatively, for lower speed applications the PIN phase modulator 260 may be forward biased for carrier injection mode, again affecting the index of refraction for the mode propagating through the PIN phase modulator 260. This mode may exhibit very high efficiency, but also high dynamic loss.

In another embodiment of the invention, the PIN phase modulator 260 may be used as a variable optical attenuator by forward biasing the structure, causing increased optical mode loss.

The TPM 270 may modulate an optical signal, the optical mode, by flowing current through a resistor defined by the n regions 251A and 251B, and the n− region 263, thereby providing electrical loss, and thus local heating. This heating alters the index of refraction of the waveguide essentially defined by the n– region of the TPM 270. This structure may exhibit relatively low efficiency, but also low dynamic loss.

Figure 3:
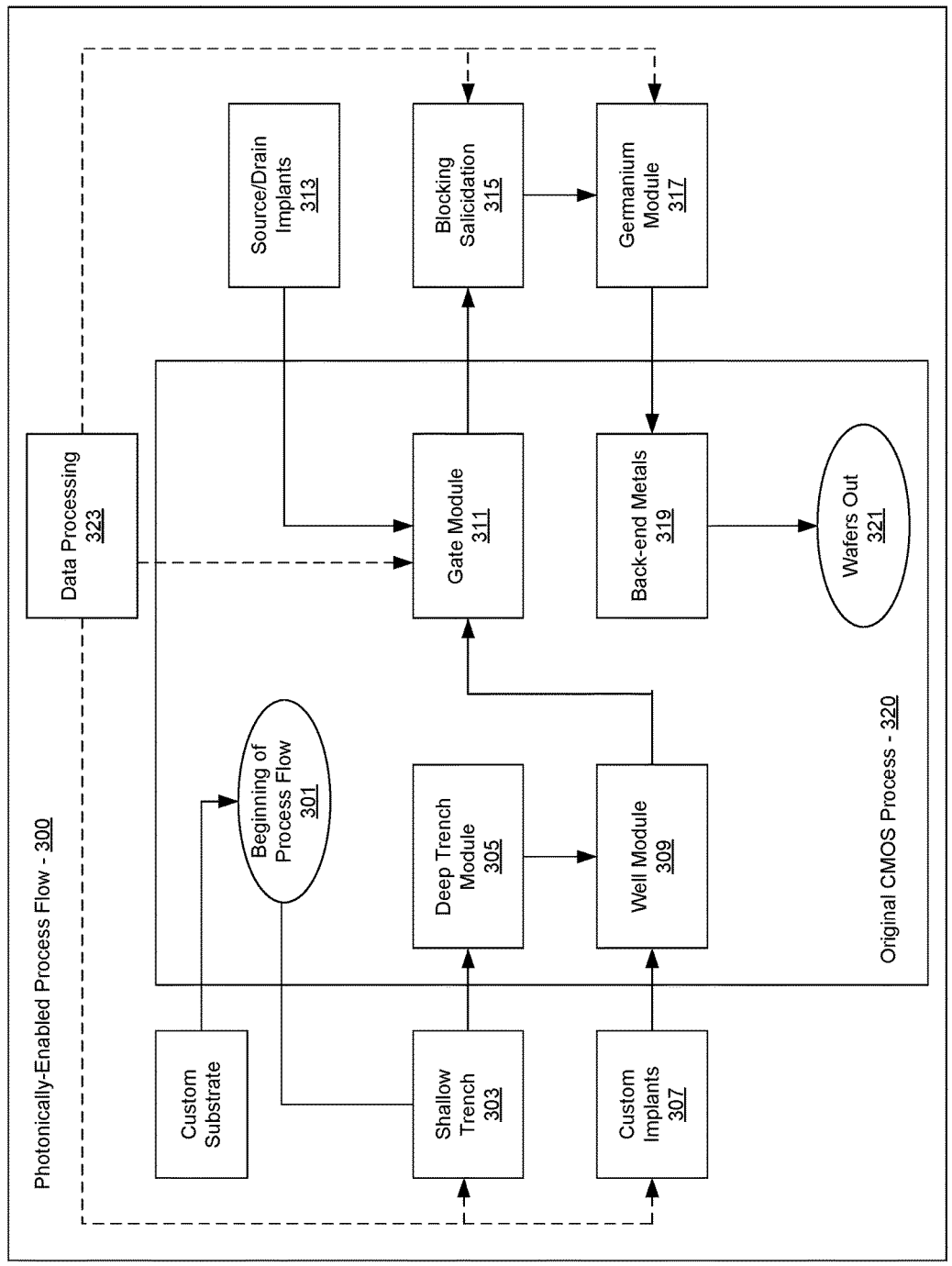
FIG. 3 is a block diagram of an exemplary photonically-enabled process flow, in accordance with an embodiment of the invention.

FIG. 3 is a block diagram of an exemplary photonically-enabled process flow, in accordance with an embodiment of the invention. Referring to FIG. 3, there is shown a photonically enabled process flow 300 comprising an original CMOS process 320, a shallow trench module 303, a custom implant module 307, source/drain implants module 313, a blocking salicidation module 315, a germanium module 317, and a data processing module 323.

The original CMOS process 320 comprises a beginning of process flow step 301, a deep trench module 305, a well module 309, a gate module 311, a back-end metals module 319, and a wafers out step 321.

The photonically-enabled process flow begins with custom SOI substrates with appropriate oxide thickness for optical processes being inserted into the beginning of process flow step 301 which may comprise suitable wafer preparation processes, such as sorting, cleaning, or quality control, for example. The wafers then proceed to the shallow trench module 303 for defining and etching of shallow trenches. The shallow trench module 303 may comprise photolithography, etching, fill, and chemical-mechanical polishing (CMP), for example, followed by the deep trench module 305, which comprises a conventional CMOS trench module.

The well module 309 comprises photolithography steps and dopant ion implantation to define the wells for CMOS devices. The custom implants module 307 may be inserted into the well module 309, to define doping regions specific to optoelectronic devices, for example. The wafers then proceed to the gate module 311 to define CMOS gates via photolithography, etching, trimming, spacers, and implants, for example. Source and drain implants may be performed by the source/drain implant module 313 before proceeding to the blocking salicidation module 315.

The salicidation module 315 generates a self-aligned silicide layer in the silicon surface for metal contacts, which is followed by the germanium module 317, which may deposit germanium for integrated photodetectors on the SOI silicon wafers. In an embodiment of the invention, the germanium process may be fully CMOS compatible. The wafers then proceed to the back-end metals module 319 which comprises a 6-metal low-k copper process, for example, followed by the wafers out step 321.

In an exemplary embodiment of the invention, the CMOS process flow comprises a 0.13 micron CMOS SOI technology platform for integrating guided-wave optics. The photolithography process comprises deep-UV technology to enable near-IR optics capability, and the high resistivity substrate may enable low microwave loss in the circuitry. Custom steps may be utilized in standard tools, and comprise silicon etch and implant, germanium epitaxy, and may utilize a standard contact module. These processes may be thermal budget compliant, and require no post processing.

Figure 4:
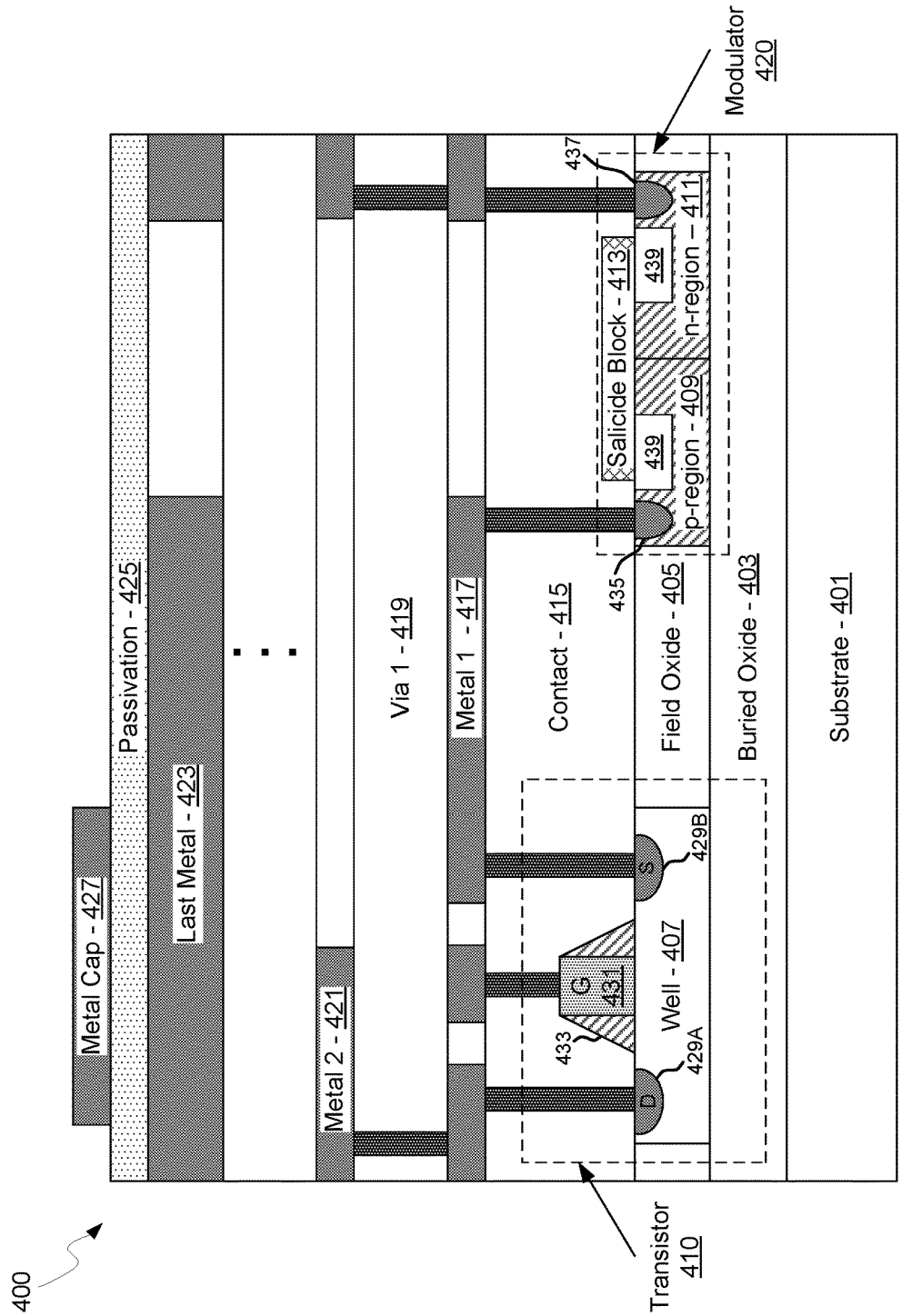
FIG. 4 is a cross-section of exemplary integrated electrical and optoelectronic devices, in accordance with an embodiment of the invention.

FIG. 4 is a cross-section of exemplary integrated electrical and optoelectronic devices, in accordance with an embodiment of the invention. Referring to FIG. 4, there is shown an integrated semiconductor structure 400 comprising a transistor 410 and a modulator 420 and associated layers. The layers are utilized to fabricate the transistor 410 and the modulator 420, to isolate, and to provide electrical connection to the devices, for example.

The integrated semiconductor structure 400 comprises a silicon substrate 401, a buried oxide 403, a field oxide 405, a contact layer 415, a metal 1 layer 417, a via 1 layer 419, a metal 2 layer 421, a last metal layer 423, a passivation layer 425, and a metal cap 427. The metal 1 layer 417, the metal 2 layer 421, the last metal layer 423, and the metal cap 427 provide electrical contact between layers and to electrical and optoelectronics devices, such as the transistor 410 and the modulator 420. The via 1 layer 419 and the contact layer 415 also enable electrical contact to the devices while providing electrical isolation between devices by incorporating insulating materials between conductive vias.

The transistor 410 comprises the well 407, drain and source implant layers 429A and 429B, respectively, a gate 431, and a passivation layer 433. The well region 407 is a doped silicon layer that enables complementary devices to be integrated on the same substrate by creating a layer of opposite doping to that of the region outside the well. In this manner, in instances where the well is n-doped, the source and drain implant layers 429A and 429B may comprise p-doped silicon, for example.

The gate 431 may comprise metal or polysilicon, for example, that may be isolated from the well 407 by a thin oxide layer (not shown). The gate may be passivated by the passivation layer 433, which may provide electrical isolation from other metal layers, for example.

The modulator 420 comprises a p-region 409, an n-region 411, a salicide block 413, and etched region 439. The salicide block 413 comprises a layer of material to prevent the silicon of the modulator 420 and other optical devices from being salicided during the standard CMOS process. If silicon in the optical devices was sailcided, large optical losses would result. Additionally, the salicide block 413 blocks unwanted implants into the waveguides and other optical devices, which would also cause unwanted loss.

Figure 5:
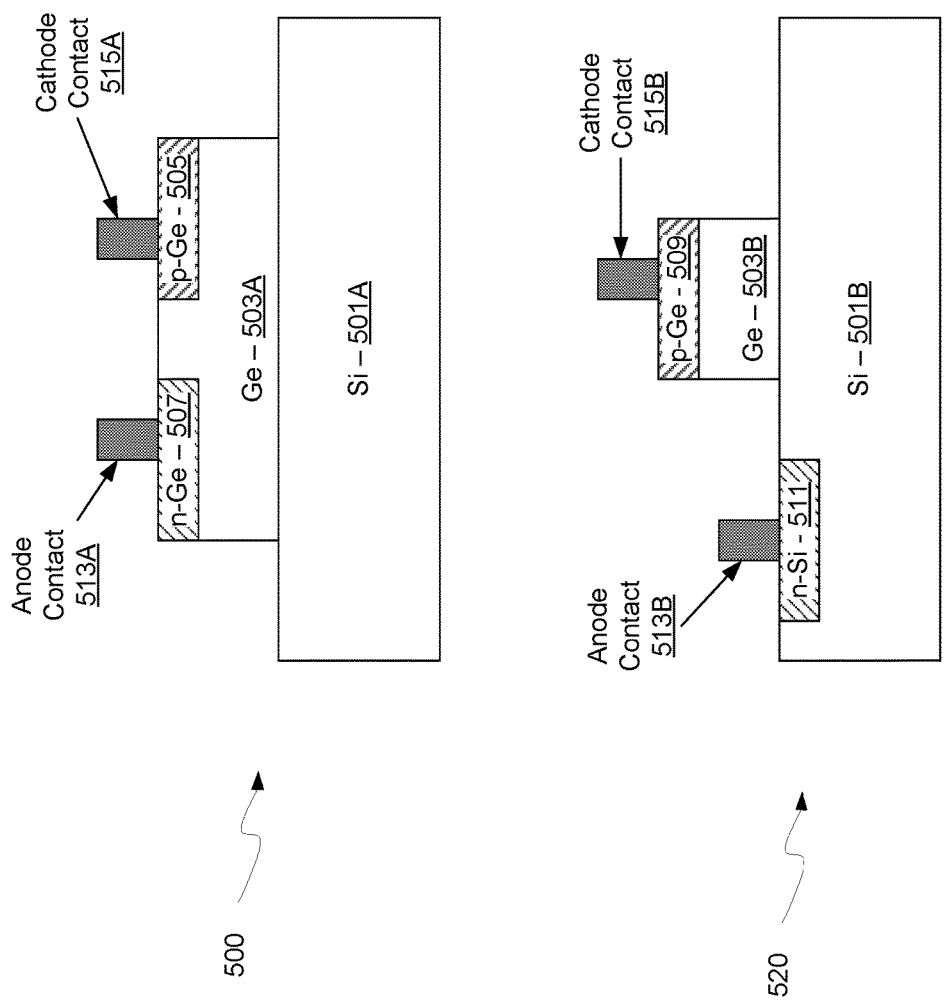
FIG. 5 is a diagram illustrating cross-sections of exemplary germanium photodiodes, in accordance with an embodiment of the invention.

FIG. 5 is a diagram illustrating cross-sections of exemplary germanium photodiodes, in accordance with an embodiment of the invention. Referring to FIG. 5, there is shown a germanium homojunction photodiode 500 and a germanium single heterojunction (SH) waveguide photodiode 520. The germanium homojunction waveguide photodiode 500 comprises a silicon substrate 501A, a Ge layer 503A, a p-doped Ge (p-Ge) layer 505, an n-doped Ge (n-Ge) layer 507, an anode contact 513A, and a cathode contact 515A. The anode contact 513A and the cathode contact 515A may comprise metal or other conductive material that enables electrical contact to the homojunction waveguide photodiode 500. The p-Ge layer 505, the Ge layer 503A, and the n-Ge layer 507 comprise a homojunction diode that may be enabled to detect an optical signal and generate an electrical output signal.

The SH photodiode 520 comprises a silicon substrate 501B, Ge layer 503B, a p-Ge layer 509, an n-doped silicon (n-Si) layer 511, an anode contact 513B, and a cathode contact 515B. The p-Ge layer 509, the Ge layer 503B, the Si substrate 501B, and the n-Si layer 511 comprise a single heterojunction diode that may be enabled to detect an optical signal and generate an electrical output signal. A heterojunction photodiode may demonstrate lower dark currents than a homojunction device, and a waveguide detector may enable higher quantum efficiencies due to the increased absorption length in the lateral direction compared to a vertical photodiode. In another embodiment of the invention, the photodiode may comprise a double heterojunction photodiode defined by two Si—Ge junctions. In an embodiment of the invention, one or more Ge waveguide photodiodes may be integrated in a CMOS chip, such as the CMOS chip 130 described with respect to FIG. 1A-1C, enabling the integration of one or more optoelectronic transceivers on the chip.

Figure 6:
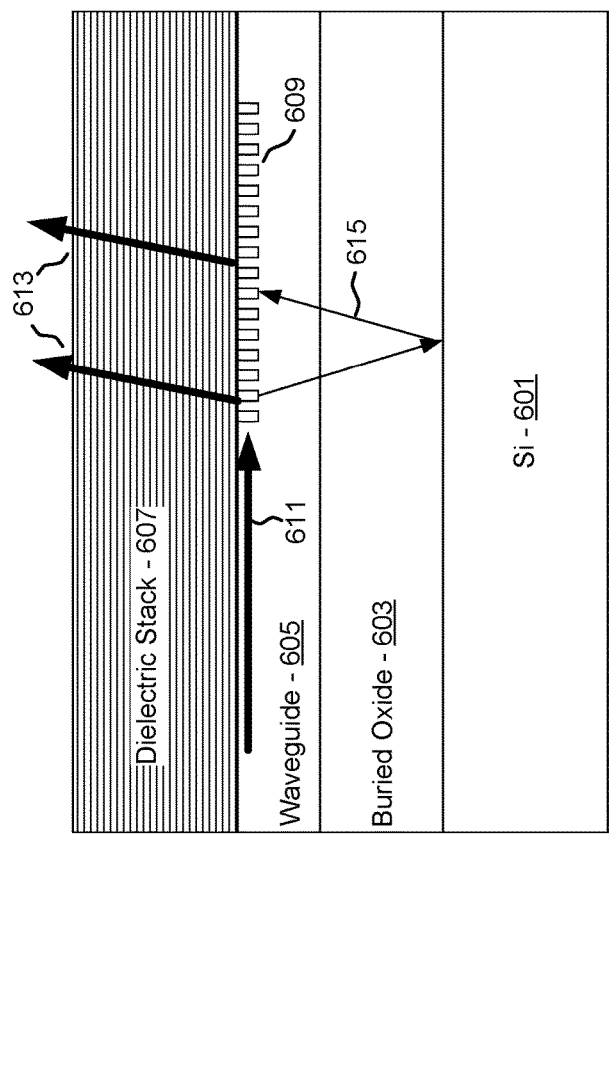
FIG. 6 is a diagram illustrating an exemplary grating coupler, in accordance with an embodiment of the invention.

FIG. 6 is a diagram illustrating an exemplary grating coupler, in accordance with an embodiment of the invention.

Referring to FIG. 6, there is shown a grating coupler 600 comprising a Si substrate 601, a buried oxide 603, a waveguide layer 605, a dielectric stack 607, a grating 609, an optical mode 611, an emitted optical mode 613, and a reflected optical mode 615. A plurality of grating couplers, such as the grating coupler 600, may be integrated in the chip 130, described with respect to FIG. 1A-1C.

The waveguide layer 605 comprises a layer of silicon, for example, that supports an optical mode 611 that may be communicated from other optical and/or optoelectronic devices in the chip 130. The grating 609 comprises a pattern of alternating dielectric constant material that is configured to transmit the optical mode 613 out of the surface of the chip 130 via the dielectric stack 607. The dielectric stack 607 may be configured to enable the transmission of the scattered optical signal out of the top surface, at an angle from vertical.

In operation, an optical mode 611 may be scattered out of the top surface of the chip 130 via the grating coupler 600. In an exemplary embodiment, loss coupling may be 1.5 dB or lower, for example, and may enable wafer-scale testing. In an embodiment of the invention, the grating coupler may enable 20× mode-size conversion laterally and longitudinally.

Figure 7:
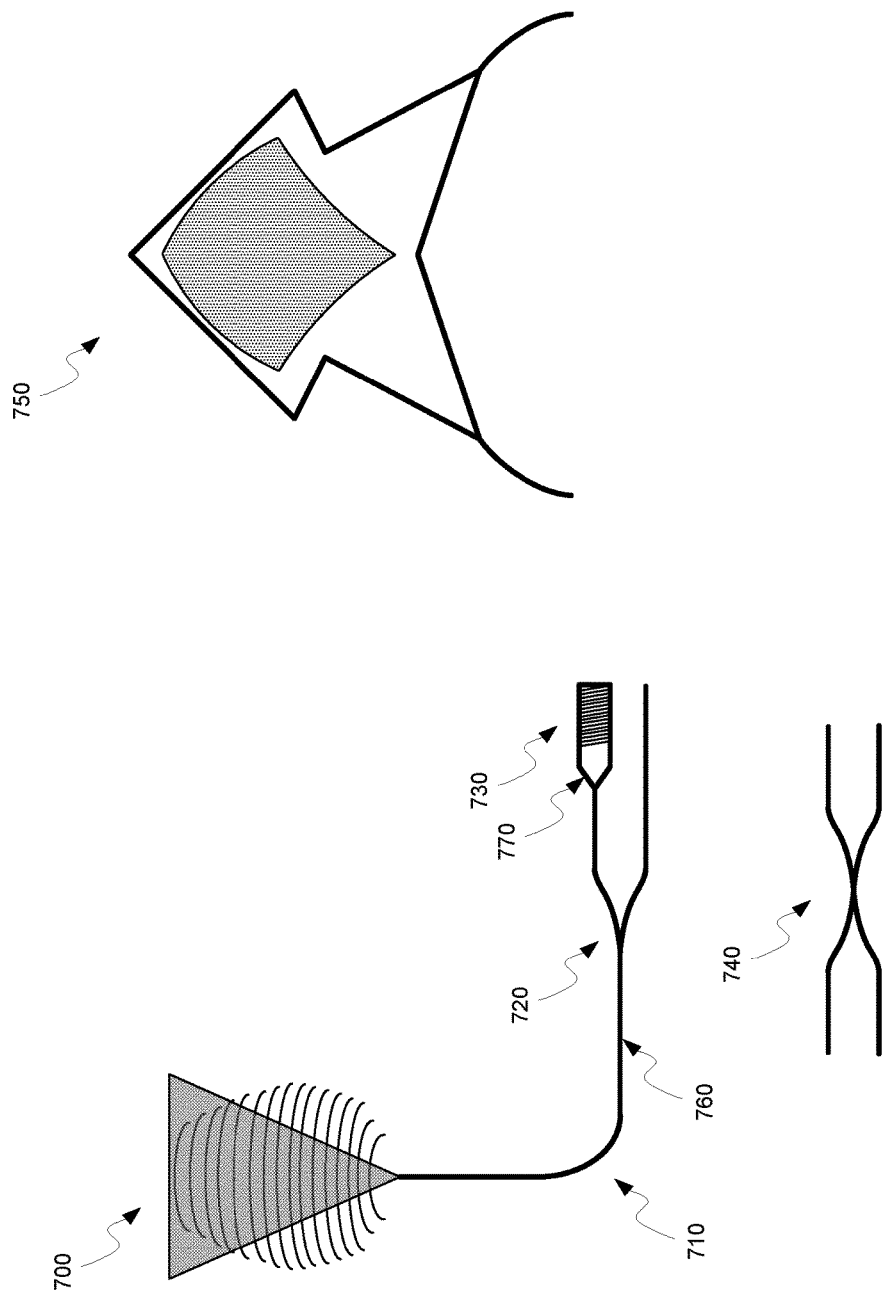
FIG. 7 is a diagram illustrating exemplary optical devices, in accordance with an embodiment of the invention.

FIG. 7 is a diagram illustrating exemplary optical devices, in accordance with an embodiment of the invention. Referring to FIG. 7, there is shown a grating coupler 700, a waveguide bend 710, a Y-junction 720, a waveguide termination 730, a directional coupler 740, a polarization splitting grating coupler 750, a waveguide 760, and a waveguide taper 770. The grating coupler 700 may be substantially similar to the grating coupler 600 described with respect to FIG. 6.

The waveguide 760 comprises a silicon waveguide that may be enabled to communicate an optical mode with minimal optical loss. The waveguide 760 may comprise a single-mode waveguide or a multi-mode waveguide. A single-mode waveguide may have higher propagation loss, but may enable tight bends with a 20 micron radius, such as the waveguide bend 710, for example, or circular rings. A multi-mode waveguide may have lower loss, and thus may be used for communicating optical signals over larger distances.

The Y-junction 720 may comprise a waveguide that splits into two separate waveguides, thus enabling signal splitting and/or signal combining. The Y-junction 720 may be wavelength and fabrication insensitive. The directional coupler 740 may comprise two optical waveguides that converge to a small distance apart, and then diverge again, thus enabling coupling and/or splitting of optical signals. The minimum spacing between the waveguides may determine the coupling efficiency of the directional coupler.

The waveguide termination 730 comprises an absorbing grating structure comprising a grating/metal/Ge structure, fabricated on a waveguide adjacent to a waveguide taper, such as the waveguide taper 770. The grating fabricated on the tapered waveguide may absorb the optical mode traveling into the waveguide termination 730, thus mitigating reflected optical signals, which may degrade performance.

The polarization splitting grating coupler (PSGC) 750 may enable the coupling of an incoming light signal and generating two output signals communicated to other optical components on the chip. The PSGC 750 may separate an incoming optical signal into two orthogonal output signals in the same TE waveguide mode. The input/output comprises any polarization, and may enable a simple polarization-diversity scheme.

Figure 8:
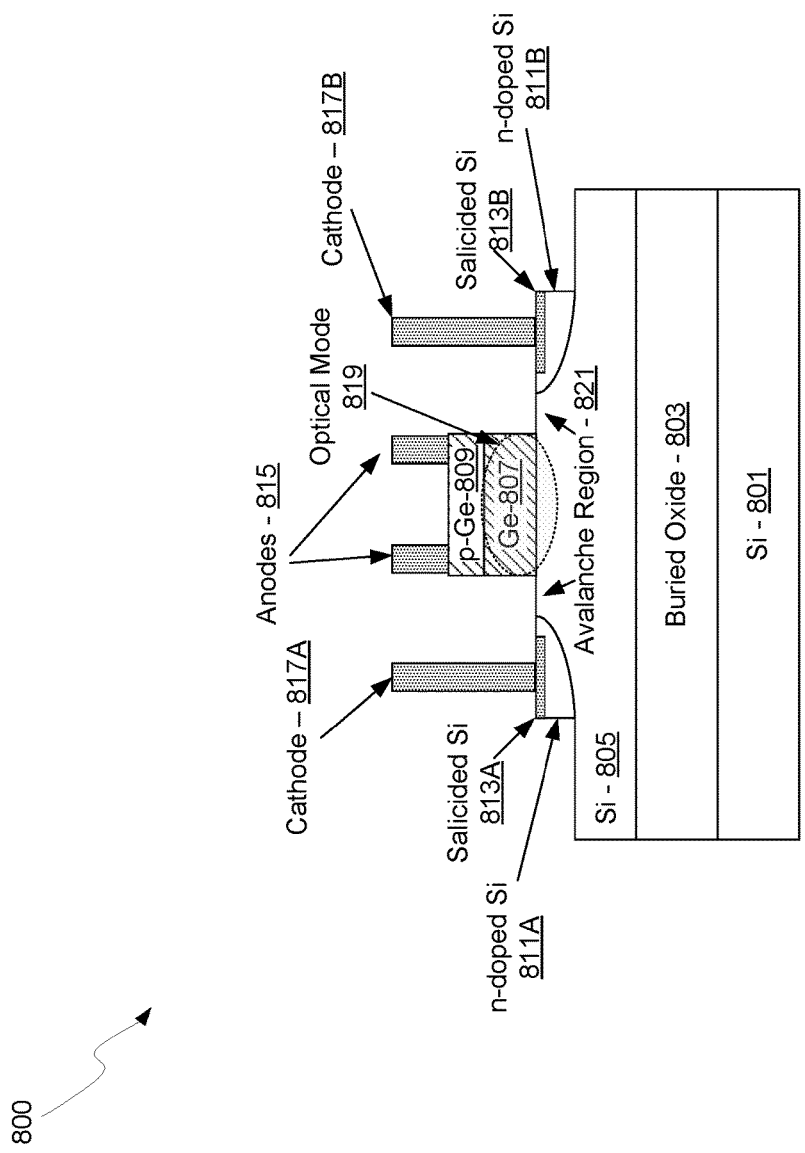
FIG. 8 is a diagram illustrating an exemplary waveguide avalanche photodiode, in accordance with an embodiment of the invention.

FIG. 8 is a diagram illustrating an exemplary waveguide avalanche photodiode, in accordance with an embodiment of the invention. Referring to FIG. 8, there is shown a germanium waveguide avalanche photodiode (Ge WG-APD) 800 integrated on a CMOS chip, such as the CMOS chip 130 described with respect to FIG. 1A-1C. The Ge WG APD 800 may be fabricated on a silicon substrate 801 and buried oxide layer 803. The Ge WG-APD 800 comprises a Si layer 805, a Ge layer 807, a p-doped Ge (p-Ge) layer 809, n-doped silicon (n-Si) layers 811A and 811B, salicided Si layers 813A and 813B, anodes 815, cathodes 817A and 817B, an optical mode 819, and an avalanche region 821.

The salicided Si layers 813A and 813B comprise silicon layers that have been salicided to enable a good electrical contact to the underlying lower, or undoped, Si layer 805. The avalanche region 821 comprises the high electric field region defined by the Ge layer 807 and the n-Si layers 811A and 811B.

In operation, the optical mode 819 may be substantially confined to the Ge layer 807 and may be absorbed creating electron-hole pairs. The electric field generated by applying a large reverse bias across the anode and cathodes separates the carriers. With appropriate bias, the electric field in the avalanche region 821 may be high enough to initiate an avalanche process, multiplying the number of photogenerated carriers by a multiplier, M, which may result in a higher responsivity than a PIN photodiode.

Figure 9:
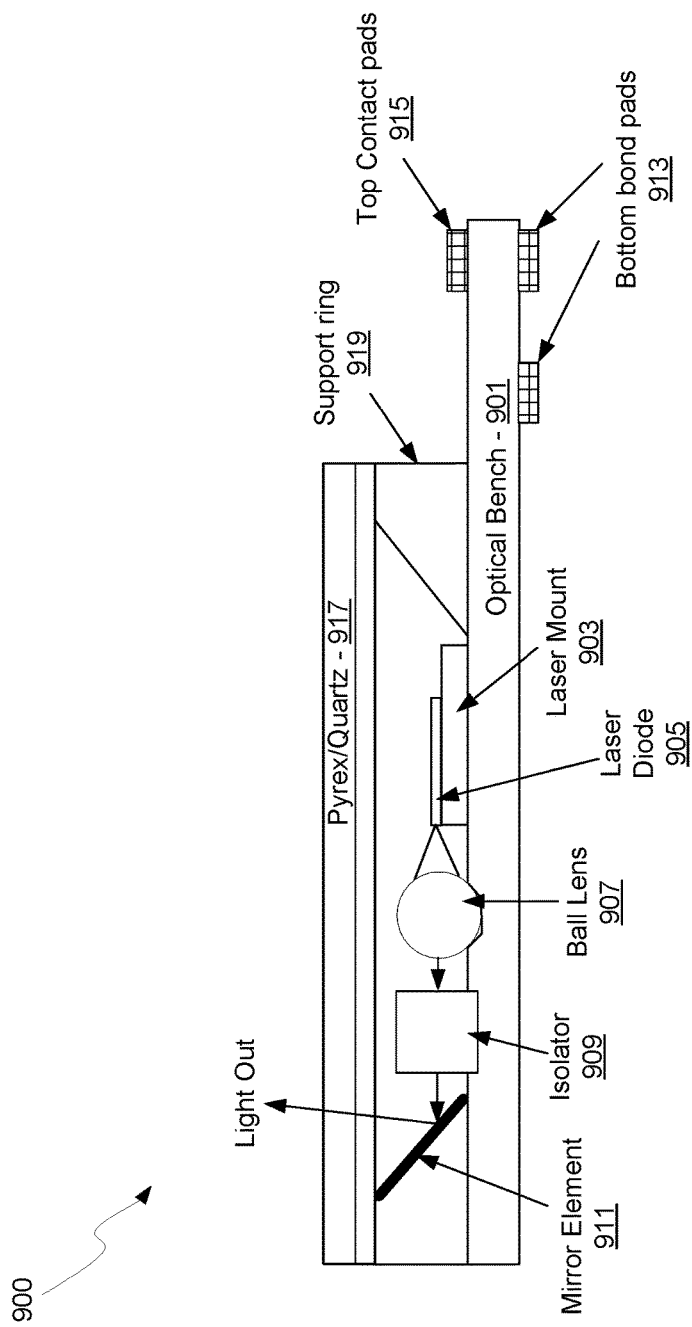
FIG. 9 is a diagram illustrating an exemplary optical source assembly, in accordance with an embodiment of the invention.

FIG. 9 is a diagram illustrating an exemplary optical source assembly, in accordance with an embodiment of the invention. Referring to FIG. 9, there is shown an optical source assembly 900 comprising an optical bench 901, a laser mount 903, a laser diode 905, a ball lens 907, an optical isolator 909, a mirror element 911, bottom bond pads 913, top contact pads 915, a pyrex/quartz lid 917, and a support ring 919.

In an embodiment of the invention, the pyrex/quartz lid 917 comprises a pyrex/quartz stack which may be orientated either way, with the pyrex or the quartz on top, and enables hermetic sealing of the optical components to improve device lifetime. The optical isolator 909 may enable the reduction of reflected signals back to the laser diode 905. In an alternative embodiment of the invention, the optical isolator comprises a faraday rotator.

The optical bench 901 comprises a silicon optical bench, for example, and is micromachined and/or etched to comprise recessed features to affix devices such as the isolator 909 and the ball lens 907, for example. The support ring 919, comprising etched silicon, for example, provides hermetic sealing in conjunction with the pyrez/quartz lid 917 and the optical bench 910. The mirror element 911 may comprise a reflective surface deposited on the support ring 919. In another embodiment of the invention, the mirror element 911 may be fabricated by etching and/or polishing the surface of the support ring 919. In an embodiment of the invention, the support ring comprises silicon which may be micromachined, such as by anisotropic etching, for example, to create an optically reflective surface for the mirror element 911.

The laser diode 905 comprises an edge-emitting semiconductor laser, for example, and may be enabled to emit an optical signal of a desired wavelength. The laser mount 903 provides mechanical support and heat sinking capability for the laser diode 905. The ball lens 907 focuses the optical signal generated by the laser diode 905 on to the isolator 909.

In an embodiment of the invention, by integrating the electrical and optical interface on the same side of the wafer, wafer-scale fiber coupling testing of the laser package may be enabled. The bottom side pad facilitates wire bonding after attachment to the CMOS die, which may be coupled to the side where the Light Out optical signal emerges. A membrane may be incorporated into the silicon bench or alternately one or more thermistors may be fabricated in the package as a hermeticity sensor.

In operation, an optical signal may be generated by the laser diode 905 which is focused and/or collimated by the ball lens 907 onto the isolator 909. The light signal is then reflected out of the optical source assembly 900 via the mirror element 911, generating the Light Out.

In an embodiment of the invention, a method and system are disclosed for receiving optical signals from one or more optical fibers via grating couplers on a top surface of a CMOS chip 130. The optical signals may be converted to electrical signals via one or more photodetectors 111A-111D integrated in or on the CMOS chip 130. The electrical signals may be processed using circuitry in the CMOS chip 107A-107D/109. A continuous-wave (CW) optical signal may be received from a laser source 147 via grating couplers on the top surface 137 of the CMOS chip 130, and may be modulated via one or more optical modulators 105A-105D integrated in or on the CMOS chip 130. Electrical signals may be received via the circuitry in the CMOS chip 130, and may drive the one or more optical modulators 105A-105D. The modulated optical signal may be communicated out of the top surface 137 of the CMOS chip 130 into one or more optical fibers via one or more grating couplers 117E-117H integrated in or on the CMOS chip 130. The received CW optical signal may be modulated using Mach-Zehnder modulators and/or ring modulators. The CMOS chip 130 may comprise a CMOS guard ring 141. The received optical signals may be communicated between devices on the CMOS chip via waveguides. The one or more photodetectors 111A-111D/113A-113H may comprise germanium waveguide photodiodes, germanium waveguide avalanche photodiodes, and/or heterojunction diodes, for example. The CW optical signal may be generated via an edge-emitting semiconductor laser and/or a vertical-cavity surface emitting semiconductor laser, which may be bonded to the top surface 137 of the CMOS chip 130, for example. The one or more modulators 105A-105D may be driven using circuitry on the CMOS chip 130.

While the invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiments disclosed, but that the present invention will include all embodiments falling within the scope of the appended claims.

What is claimed is:

1. A method for processing signals, the method comprising:
   in a CMOS chip comprising photonics devices and electronics devices:
      receiving optical signals from one or more optical fibers via optical couplers on a surface of said CMOS chip;
      converting said optical signals to electrical signals via one or more photodetectors integrated in said CMOS chip;
      receiving a continuous-wave (CW) optical signal from a laser source via optical couplers on said surface of said CMOS chip;
      modulating said received CW optical signal using one or more optical modulators integrated in said CMOS chip;
      receiving electrical signals from circuitry in said CMOS chip;
      driving said one or more optical modulators using said received electrical signals; and
      communicating said modulated optical signal out of said surface of said CMOS chip into one or more optical fibers via one or more optical couplers integrated in said CMOS chip.

2. The method according to claim 1, comprising modulating said received CW optical signal using Mach-Zehnder modulators.

3. The method according to claim 1, comprising modulating said received CW optical signal using ring modulators.

4. The method according to claim 1, wherein said CMOS chip comprises a CMOS guard ring.

5. The method according to claim 1, comprising communicating said received optical signals between devices on said CMOS chip via waveguides.

6. The method according to claim 1, wherein said one or more photodetectors comprise germanium waveguide photodiodes.

7. The method according to claim 1, wherein said wherein said one or more photodetectors comprise germanium waveguide avalanche photodiodes.

8. The method according to claim 1, wherein said wherein said one or more photodetectors comprise heterojunction diodes.

9. The method according to claim 1, comprising generating said CW optical signal using an edge-emitting semiconductor laser.

10. The method according to claim 1, comprising generating said CW optical signal using a vertical-cavity surface emitting semiconductor laser.

11. The method according to claim 1, wherein said laser source is bonded to said surface of said CMOS chip.

12. The method according to claim 1, wherein said photonics devices comprise said one or more optical couplers, said one or more photodetectors, and said one or more optical modulators.

13. The method according to claim 1, wherein said one or more optical couplers comprise grating couplers.

14. A system for processing signals, the system comprising:
   a CMOS chip comprising photonics devices and electronics devices, wherein said CMOS chip comprises:
      one or more optical couplers on a surface of said CMOS chip and enabled to receive optical signals from one or more optical fibers;
      one or more photodetectors integrated in said CMOS chip and enabled to convert said received optical signals to electrical signals;
      one or more optical couplers on said surface of said CMOS chip and enabled to receive a continuous-wave (CW) optical signal from a laser source;
      one or more optical modulators integrated in said CMOS chip and enabled to modulate said received CW optical signal;

one or more circuits integrated in said CMOS chip and enabled to receive electrical signals and drive said one or more optical modulators using said received electrical signals; and one or more optical couplers integrated in said CMOS chip and enabled to communicate said modulated optical signal out of said surface of said CMOS chip into one or more optical fibers.

15. The system according to claim 14, wherein said optical modulators comprise Mach-Zehnder modulators.

16. The system according to claim 14, wherein said optical modulators comprise ring modulators.

17. The system according to claim 14, wherein said CMOS chip comprises a CMOS guard ring.

18. The system according to claim 14, wherein said received optical signals are communicated between devices on said CMOS chip using waveguides.

19. The system according to claim 14, wherein said one or more photodetectors comprise germanium waveguide photodiodes.

20. The system according to claim 14, wherein said wherein said one or more photodetectors comprise germanium waveguide avalanche photodiodes.

21. The system according to claim 14, wherein said wherein said one or more photodetectors comprise heterojunction diodes.

22. The system according to claim 14, wherein said laser source is an edge-emitting semiconductor laser.

23. The system according to claim 14, wherein said laser source is a vertical-cavity surface emitting semiconductor laser.

24. The system according to claim 14, wherein said laser source is bonded to said surface of said CMOS chip.

25. The system according to claim 14, wherein said photonics devices comprise said one or more optical couplers, said one or more photodetectors, and said one or more optical modulators.

26. The system according to claim 14, wherein said one or more optical couplers comprise grating couplers.

* * * * *